United States Patent
Young et al.

(10) Patent No.: US 8,415,921 B1
(45) Date of Patent: Apr. 9, 2013

(54) TOOLBOX DEVICE

(76) Inventors: Richard E. Young, Los Angeles, CA (US); Roy A. Castellanos, Hacienda Heights, CA (US)

(*) Notice: Subject to any disclaimer, the term of this patent is extended or adjusted under 35 U.S.C. 154(b) by 361 days.

(21) Appl. No.: 12/904,412

(22) Filed: Oct. 14, 2010

(51) Int. Cl.
*H02J 7/00* (2006.01)

(52) U.S. Cl.
USPC .................... 320/112; 320/107; 320/111

(58) Field of Classification Search .............. 320/112
See application file for complete search history.

(56) References Cited

U.S. PATENT DOCUMENTS

| | | | |
|---|---|---|---|
| 4,507,856 A * | 4/1985 | Pearson | 29/623.1 |
| 5,339,956 A | 8/1994 | Thomason | |
| 5,344,339 A | 9/1994 | Cheslock | |
| D375,311 S | 11/1996 | Keseling et al. | |
| D376,909 S | 12/1996 | Dickinson et al. | |
| 5,810,168 A | 9/1998 | Eggering | |
| 5,833,065 A | 11/1998 | Burgess | |
| 6,662,945 B1 | 12/2003 | Chang | |
| 7,334,680 B2 * | 2/2008 | Cunningham et al. | 206/372 |
| 2003/0019870 A1 * | 1/2003 | Ekerot et al. | 220/23.2 |
| 2003/0106821 A1 * | 6/2003 | Bar-Erez | 206/373 |
| 2005/0156564 A1 | 7/2005 | Krieger | |
| 2009/0019659 A1 * | 1/2009 | Hill et al. | 15/257.06 |
| 2009/0200189 A1 * | 8/2009 | Fields | 206/372 |
| 2010/0072215 A1 * | 3/2010 | Coon | 220/735 |

* cited by examiner

*Primary Examiner* — Arun Williams

(57) ABSTRACT

A toolbox device for allowing a user to charge a battery pack of a battery-powered tool. The device features a first half housing pivotally attached atop a second half housing with an inner compartment, the second half housing is longer than the first half housing thereby exposing a top area of the second half housing with a battery pack compartment. An AC-DC converter unit is operatively connected to contact strips disposed on the inner surface of the battery pack compartment. A male power plug is operatively connected to the AC/DC converter unit, the male power plug is adapted to receive a power cord for a standard power outlet. A charger component for accepting a battery pack is adapted to be inserted into the battery pack compartment. When inserted into the battery pack compartment, the interchangeable charger component operatively connects to the contact strips.

4 Claims, 3 Drawing Sheets

TOOLBOX DEVICE

FIELD OF THE INVENTION

The present invention is directed to a device for storing tools. More particularly, the present invention is directed to a device for storing tools having a charging unit for charging battery packs of battery-powered tools.

BACKGROUND OF THE INVENTION

An object of this invention is to provide a toolbox device that allows a user to charge a battery of a battery-powered tool. Another object of this invention is to allow a user to have extra power outlets when needed. The present invention features a toolbox device for allowing a user to charge a battery pack of a battery-powered tool.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a toolbox device. In some embodiments, the device comprises a first half housing and a second half housing, the second half housing having an inner compartment for storing tools. The first half is pivotally attached to the second half via a hinge mechanism. The first half housing can be pivoted between multiple positions including an open position and a closed position respectively allowing and preventing access to the inner compartment of the second half housing. The second half housing has a length that is longer than that of the first half housing thereby exposing a top area of the second half housing.

The device further comprises a locking mechanism for securing the first half housing in the closed position and a handle for carrying the toolbox device disposed on a top of the first half housing. A battery pack compartment is disposed in the top area of the second half housing, wherein contact strips are disposed on an inner surface of the battery pack compartment. An AC-DC converter unit is operatively connected to the contact strips disposed on the inner surface of the battery pack compartment. A male power plug is disposed on the second half housing, the male power plug is operatively connected to the AC/DC converter unit. The male power plug is adapted to receive a power cord for operatively connecting a standard power outlet to the male power plug. A toolbox power outlet adapted to receive a power cord is disposed on the second half housing. The toolbox power outlet is operatively connected to either the AC/DC converter unit or the male power plug. The device further comprises an interchangeable charger component for accepting a battery pack. The interchangeable charger component is adapted to be inserted into the battery pack compartment. When inserted into the battery pack compartment, the interchangeable charger component operatively connects to the contact strips.

In some embodiments, the hinge mechanism is disposed at an intersection of a back of the first half housing and a back of the second half housing. In some embodiments, the locking mechanism is disposed at an intersection of a front of the first half housing and a front of the second half housing. In some embodiments, the interchangeable charger component comprises at least one indicator light, the indicator light is illuminated if a battery pack engaged with the interchangeable charger component is either (i) defective; (ii) fully charged; or (iii) charging.

DESCRIPTION OF PREFERRED EMBODIMENTS

Figure 1:
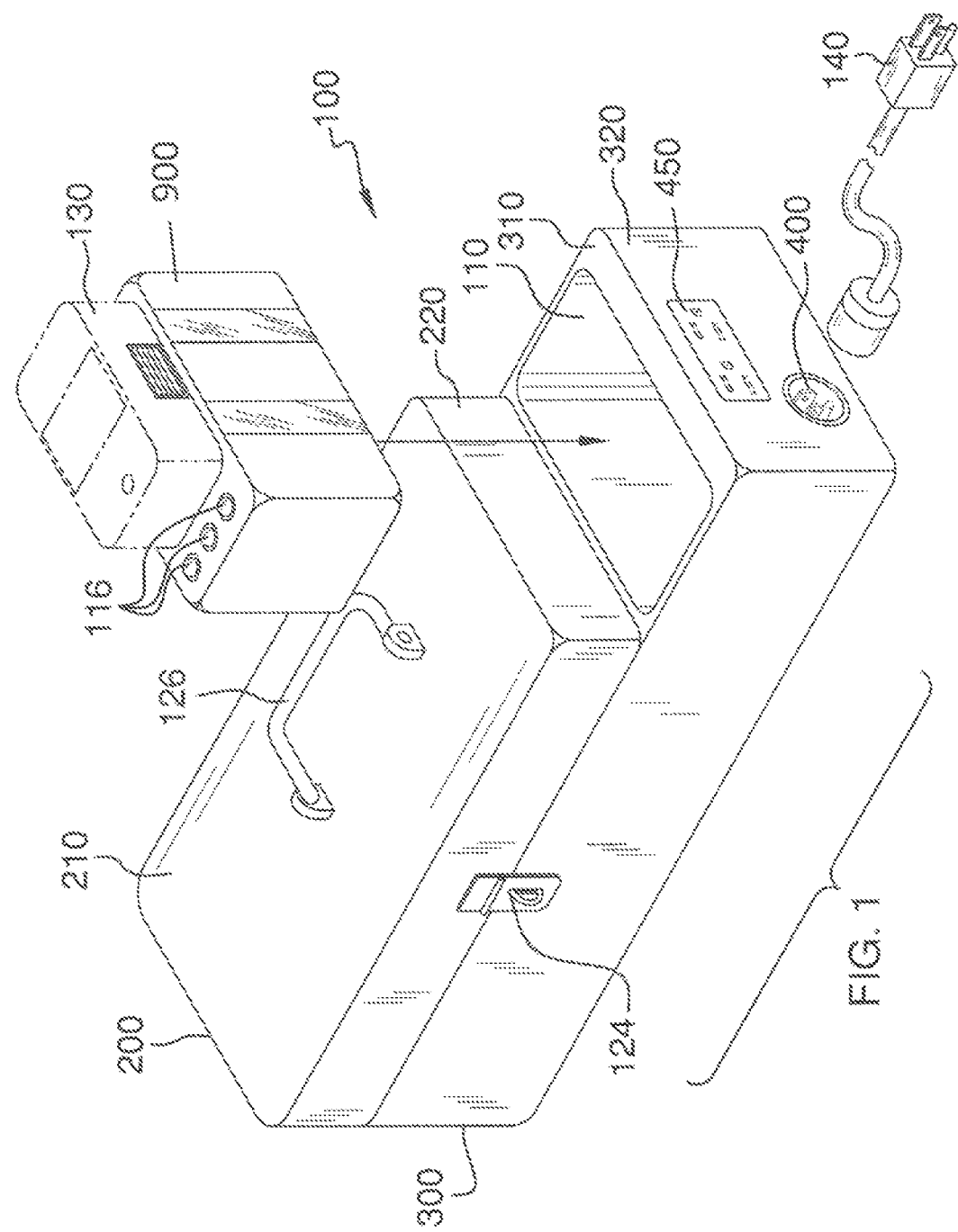
FIG. 1 is a perspective view of the toolbox device of the present invention.
Figure 2:
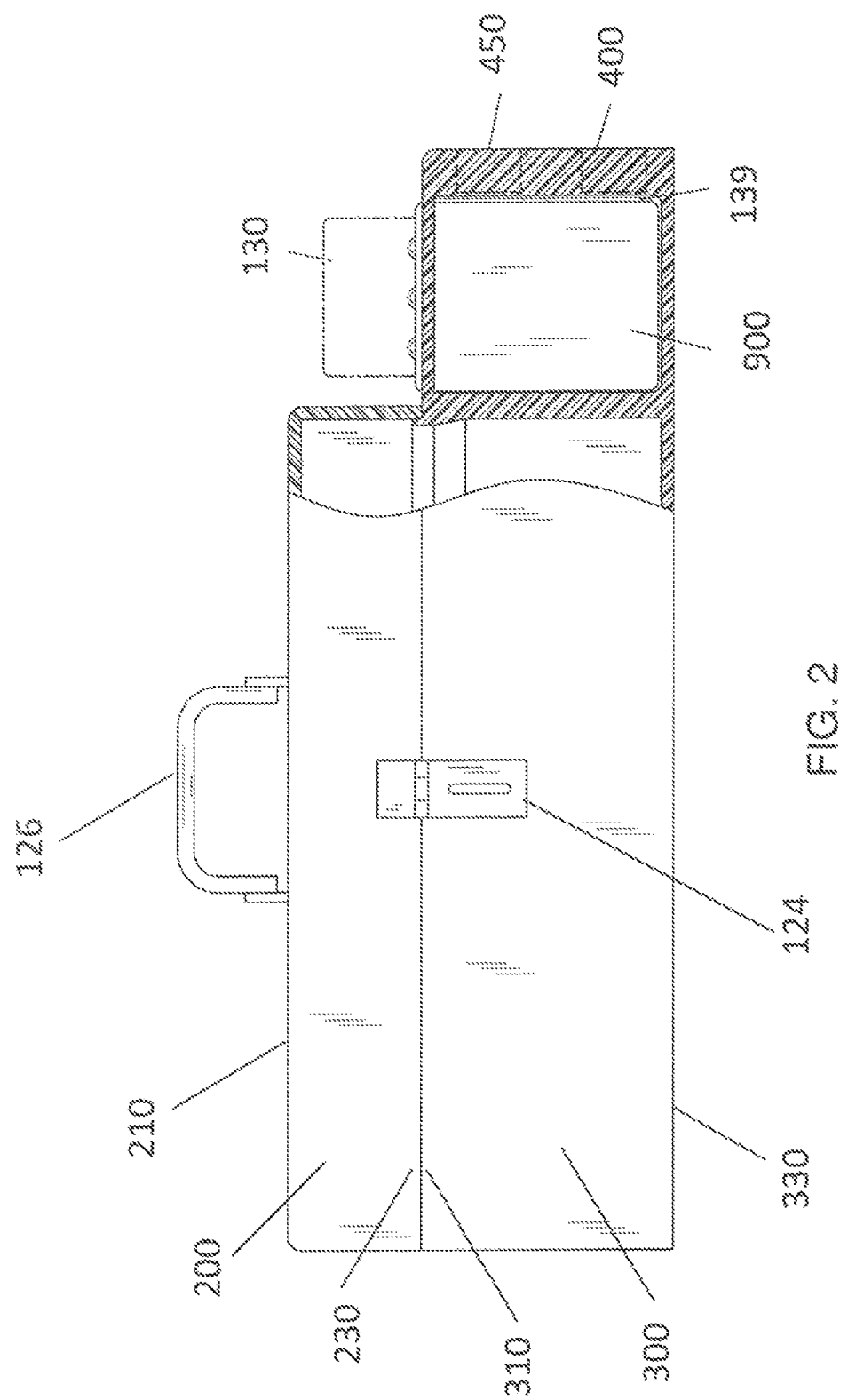
FIG. 2 is a front view and cross-sectional view of the toolbox device of the present invention.
Figure 3:
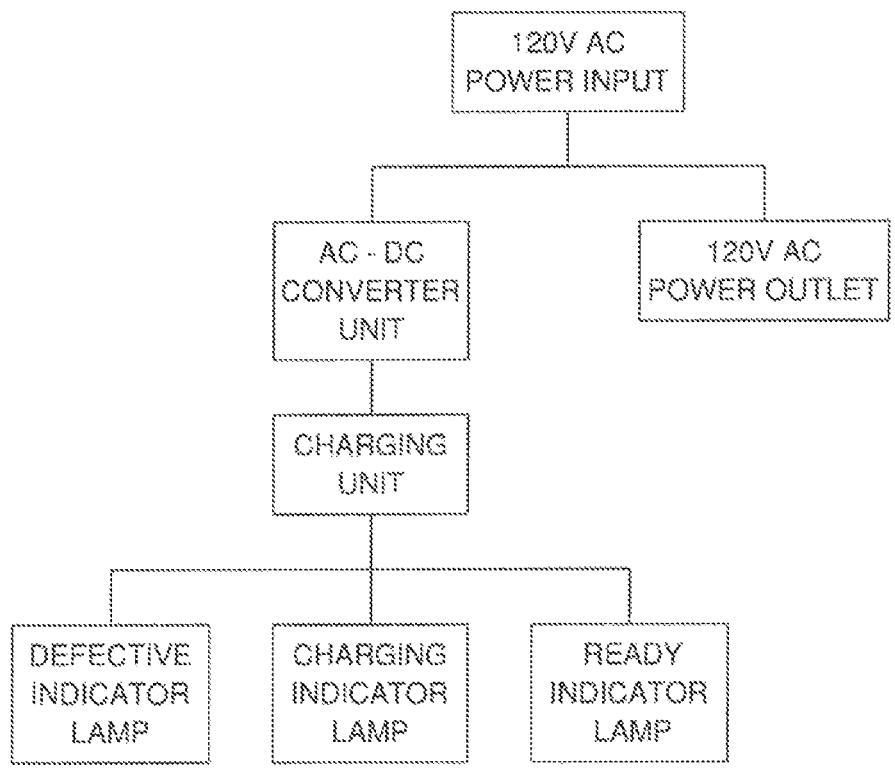
FIG. 3 is a schematic representation of the electrical components of the toolbox device of the present invention.

Referring now to FIGS. 1-3, the present invention features a toolbox device 100 for allowing a user to charge a battery pack of a battery-powered tool. In some embodiments, the toolbox device 100 of the present invention comprises an interchangeable charger, which can be used to fit various tools and models.

The toolbox device 100 comprises a first half housing 200 and a second half housing 300. The first half housing 200 has a top 210, a bottom 230, a front, a back, and a side 220. The second half housing 300 has a top 310, a bottom 330, a front, a back, and a side 320. Disposed in the second half housing 300 is an inner compartment for storing tools. The bottom 230 of the first half housing 200 is removably attached to the top 310 of the second half housing 300 via a hinge mechanism, e.g., disposed at the intersection of the back of the first half housing 200 and the back of the second half housing 300. The first half housing 200 can move between multiple positions including an open position and a closed position respectively allowing and preventing access to the inner compartment of the second half housing 300 (for storing tools).

The first half housing 200 and second half housing 300 can be secured in the closed position via a locking mechanism 124 (e.g., disposed at the intersection of the front of the first half housing 200 and the front of the second half housing 300). In some embodiments, a handle 126 is disposed on the device 100, for example on the top 210 of the first half housing 200.

Disposed on the top 310 of the second half housing 300 is a battery pack compartment 110 for receiving a battery pack 130 of a battery-powered tool and an interchangeable charger component 900. The battery pack compartment 110 has an inner surface, wherein charging strips 139 are disposed on the inner surface. The charging strips 139 can operatively connected to the interchangeable charger component 900 when the interchangeable charger component 900 is inserted into the battery pack compartment 110. The battery pack 130 is adapted to engage the interchangeable charger component 900, and the interchangeable charger component 900 charges the battery pack 130 (when inserted into the battery pack compartment 110). In some embodiments, the interchangeable charger component 900 is removable. In some embodiments, the interchangeable charger component 900 is replaceable and interchangeable with other types of charging units so as to suit a user's varying needs (e.g., for charging various types of batteries).

Disposed on the side of the second half of the toolbox device is a male power plug 400. In some embodiments, a power cord 140 (having a female component and a male component) is connected to the male power plug 400. The power cord 140 is for inserting to a standard power outlet (e.g., socket) that is connected to a power supply (e.g., AC commercial power supply). The male power plug 400 can operatively connect via the contact strips 139 (e.g., an via an AC-DC converter unit) to the interchangeable charger component 900 such that when the male power plug 400 receives power via the power cord 140, power is delivered to the interchangeable charger component 900 to charge the battery pack 130.

Disposed on the side 320 of the second half housing 300 of the toolbox device 100 is a toolbox power outlet 450 (e.g., socket) for receiving an alternative power cord of a power tool. The toolbox power outlet 450 is for providing additional power outlets to, a user for such a power tool. The toolbox power outlet 450 is operatively connected to the male power plug 400 (e.g., AC commercial power supply), such that power can be supplied to the toolbox power outlet 450 and thus to the power tools connected to the toolbox power outlet 450. This mechanism is similar to standard devices for providing additional power outlets. In some embodiments, the outlet 450 is equipped with a breaker so as to protect against overload.

In some embodiments, one or more indicator lights 116 are disposed on the top 310 of the second half housing 300. In some embodiments, one or more indicator lights 116 are disposed on the interchangeable charger component 900. In some embodiments, an indicator light 116 signals that the battery pack 130 that is connected to the interchangeable charger component 900 is defective. In some embodiments, an indicator light 116 signals that the battery pack 130 that is connected to the interchangeable charger component 900 is charging. In some embodiments, an indicator light 16 signals that the battery pack 130 that is connected to the interchangeable charger component 900 is fully charged (e.g., ready). The indicator lights 116 may be operatively connected to the interchangeable charger component 900. Charging units with indicator lights that can indicate that the battery pack is defective, charging, or ready are well known to one of ordinary skill in the art. For example, such devices may include a Multi-Volt Battery Charger 7.2-19.2-24V (e.g., Black and Decker).

In some embodiments, an indicator light 116 (e.g., defective indicator light) is illuminated when the battery pack 130 attached to the interchangeable charger component 900 is defective. In some embodiments, an indicator light 116 (e.g., charge indicator light) is illuminated when the battery pack 130 attached to the interchangeable charger component 900 is charging. In some embodiments, an indicator light 116 (e.g., ready indicator light) is illuminated when the battery pack 130 attached to the interchangeable charger component 900 is fully charged.

In some embodiments, a user removes a battery pack 130 from a battery-powered tool and places the battery pack 130 in the interchangeable charger component 900, and further places the battery pack 130 and interchangeable charger component 900 in the battery pack compartment 110 disposed in the toolbox device 100 to charge the battery pack 130. In some embodiments, a user plugs the power cord 140 connected to the toolbox device 100 (e.g., the male power plug 400) into a standard power outlet.

As shown in FIG. 3, in some embodiments, a power supply (e.g., 120 volt AC power input) connects to the male power plug 400, which is operatively connected to an AC-DC converter unit to convert alternating current into direct current. The male power plug 400 (e.g., power input) and/or the AC-DC converter unit is operatively connected to the contact strips 139. In some embodiments, an interchangeable charger component 900 (e.g., "charging unit") is operatively connected to the AC-DC converter unit (e.g., via contact strips 139) to draw power to charge a battery pack 130. In some embodiments, the interchangeable charger component 900 is operatively connected to one or more indicator lights 116 (e.g., defective, charge, ready). In some embodiments the AC-DC converter unit is operatively connected to the toolbox power outlet 450. In some embodiments, the power supply (e.g., AC power input) is operatively connected to the toolbox power outlet 450.

In some embodiments, the interchangeable charger component 900 is a standard battery charging unit that recharges battery packs. Battery charging units are well known to one of ordinary skill in the art. In some embodiments, the toolbox power outlet 450 (e.g., socket) is a standard power outlet known to one of ordinary skill in the art. In some embodiments, the male power plug 400 is a standard power plug well known to one of ordinary skill in the art. In some embodiments, the locking mechanism 124 is a standard clasp or latch locking mechanism known to one of ordinary skill in the art.

The toolbox device 100 may be constructed from a variety of materials. For example, in some embodiments, the toolbox device 100 is constructed from a metal, a plastic, the like, or a combination thereof.

As used herein, the term "about" refers to plus or minus 10% of the referenced number. For example, an embodiment wherein the first half housing 200 is about 10 inches in width includes a first half housing 200 that is between 9 to 11 inches in length.

In some embodiments, the first half housing 200 and/or second half housing 300 is between about 6 to 8 inches in width as measured from the front to the back. In some embodiments, the first half housing 200 and/or second half housing 300 is between about 8 to 12 inches in width as measured from the front to the back. In some embodiments, the first half housing 200 and/or second half housing 300 is between about 12 to 18 inches in width as measured from the front to the back.

In some embodiments, the first half housing 200 and/or second half housing 300 is between about 16 to 20 inches in length as measured from the side to a second side. In some embodiments, the first half housing 200 and/or second half housing 300 is between about 20 to 24 inches in length as measured from the side to a second side. In some embodiments, the first half housing 200 and/or second half housing 300 is between about 24 to 30 inches in width as measured from the side to a second side. In some embodiments, the first half housing 200 and/or second half housing 300 is between about 30 to 36 inches in length as measured from the side to a second side.

In some embodiments, the first half housing 200 and/or second half housing 300 is between about 2 to 4 inches in height as measured from the top to the bottom. In some embodiments, the first half housing 200 and/or second half housing 300 is between about 4 to 8 inches in height as measured from the top to the bottom.

Referring now to FIG. 3, the charging unit is operatively connected to the indicator lights (e.g., defector indicator lamp, charging indicator lamp, ready indicator lamp) and the AC/DC converter unit. The AC/DC converter unit is operatively connected to AC power input and AC power outlet.

The following the disclosures of the following U.S. Patents are incorporated in their entirety by reference herein: U.S. Pat. No. 6,662,945 B1; 5,833,065; U.S. Pat. No. 5,810,168; U.S. Pat. No. 5,344,339; U.S. Pat. No. 5,810,168; U.S. Pat. No. 5,339,956; U.S. Pat. Application No. 2005/0156564 A1.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A toolbox device comprising:
   (a) a first half housing;
   (b) a second half housing having an inner compartment for storing tools, wherein the first half is pivotally attached to the second half via a hinge mechanism, the first half housing can be pivoted between multiple positions including an open position and a closed position respectively allowing and preventing access to the inner compartment of the second half housing, wherein the second half housing has a length that is longer than that of the first half housing thereby exposing a top area of the second half housing;
   (c) a locking mechanism for securing the first half housing in the closed position;
   (d) a handle for carrying the toolbox device disposed on a top of the first half housing;
   (e) a battery pack compartment disposed in the top area of the second half housing, wherein contact strips are disposed on an inner surface of the battery pack compartment;
   (f) an AC-DC converter unit operatively connected to the contact strips disposed on the inner surface of the battery pack compartment;
   (g) a male power plug disposed on the second half housing, the male power plug is operatively connected to the AC/DC converter unit, the male power plug is adapted to receive a power cord for operatively connecting a standard power outlet to the male power plug;
   (h) a toolbox power outlet adapted to receive a power cord, the power outlet being disposed on the second half housing, the toolbox power outlet is operatively connected to either the AC/DC converter unit or the male power plug; and
   (i) an interchangeable charger component for accepting a battery pack, the interchangeable charger component is adapted to be inserted into the battery pack compartment, when inserted into the battery pack compartment the interchangeable charger component operatively connects to the contact strips.

2. The device of claim 1, wherein the hinge mechanism is disposed at an intersection of a back of the first half housing and a back of the second half housing.

3. The device of claim 1, wherein the locking mechanism is disposed at an intersection of a front of the first half housing and a front of the second half housing.

4. The device of claim 1, wherein the interchangeable charger component comprises at least one indicator light, the indicator light is illuminated if a battery pack engaged with the interchangeable charger component is either (i) defective; (ii) fully charged; or (iii) charging.

* * * * *